US012223830B1

(12) United States Patent
Shannon

(10) Patent No.: US 12,223,830 B1
(45) Date of Patent: Feb. 11, 2025

(54) TRAFFIC LIGHT CONTROL SYSTEM FOR EMERGENCY VEHICLES

(71) Applicant: Arthur Quinten Shannon, St. Petersburg, FL (US)

(72) Inventor: Arthur Quinten Shannon, St. Petersburg, FL (US)

( * ) Notice: Subject to any disclaimer, the term of this patent is extended or adjusted under 35 U.S.C. 154(b) by 59 days.

(21) Appl. No.: 18/208,978

(22) Filed: Jun. 13, 2023

(51) Int. Cl.
*G08G 1/087* (2006.01)
*G08G 1/095* (2006.01)

(52) U.S. Cl.
CPC ............. *G08G 1/087* (2013.01); *G08G 1/095* (2013.01)

(58) Field of Classification Search
CPC ............................... G08G 1/087; G08G 1/095
See application file for complete search history.

(56) References Cited

U.S. PATENT DOCUMENTS 4,806,931 A * 2/1989 Nelson ................... G08G 1/087 367/199
5,677,684 A 10/1997 McArthur
5,710,555 A * 1/1998 McConnell .......... G08G 1/0965 340/904
D431,484 S 10/2000 McMullen
6,137,887 A * 10/2000 Anderson ............. H04R 3/005 381/92
7,884,738 B2 2/2011 Pappas
8,094,040 B1 * 1/2012 Cornett .................. G08G 1/087 340/916
11,170,643 B1 11/2021 Carter
11,270,582 B1 3/2022 Jenkins
11,341,753 B2 5/2022 Narayanan
2013/0027221 A1 1/2013 Johnson
2018/0096595 A1 * 4/2018 Janzen ................... G06V 10/94
2022/0122450 A1 4/2022 Basden

FOREIGN PATENT DOCUMENTS

GB 2531496 12/2018

* cited by examiner

*Primary Examiner* — Omer S Khan

(57) ABSTRACT

The traffic light control system for emergency vehicles is an electric circuit. The traffic light control system for emergency vehicles is configured for use with a road network. The traffic light control system for emergency vehicles controls one or more traffic control signals that are used to control the flow of traffic over the road network. The traffic light control system for emergency vehicles detects the presence of an emergency vehicle that: a) is operating as a privileged vehicle under traffic regulations; and, b) is approaching a traffic intersection. The traffic light control system for emergency vehicles illuminates a beacon that warns traffic about the oncoming emergency vehicle.

10 Claims, 4 Drawing Sheets

TRAFFIC LIGHT CONTROL SYSTEM FOR EMERGENCY VEHICLES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of overrides of traffic control by signal transmitted by an emergency vehicle. (G08G1/087)

Summary of Invention

The traffic light control system for emergency vehicles is an electric circuit. The traffic light control system for emergency vehicles is configured for use with a road network. The traffic light control system for emergency vehicles controls one or more traffic control signals that are used to control the flow of traffic over the road network. The traffic light control system for emergency vehicles detects the presence of an emergency vehicle that: a) is operating as a privileged vehicle under traffic regulations; and, b) is approaching a traffic intersection. The traffic light control system for emergency vehicles illuminates a beacon that warns traffic about the oncoming emergency vehicle. The traffic light control system for emergency vehicles comprises a plurality of directional microphones, a band pass filter circuit, a threshold circuit, a relay circuit, a timing circuit, and a plurality of lamp circuits. The plurality of directional microphones, the band pass filter circuit, the threshold circuit, the relay circuit, the timing circuit, and the plurality of lamp circuits are electrically interconnected.

These together with additional objects, features and advantages of the traffic light control system for emergency vehicles will be readily apparent to those of ordinary skill in the art upon reading the following detailed description of the 13 presently preferred, but nonetheless illustrative, embodiments when taken in conjunction with the accompanying drawings.

In this respect, before explaining the current embodiments of the traffic light control system for emergency vehicles in detail, it is to be understood that the traffic light control system for emergency vehicles is not limited in its applications 19 to the details of construction and arrangements of the components set forth in the following description or illustration. Those skilled in the art will appreciate that the concept of this disclosure may be readily utilized as a basis for the design of other structures, methods, and systems for carrying out the several purposes of the traffic light control system for emergency vehicles.

It is therefore important that the claims be regarded as including such equivalent construction insofar as they do not depart from the spirit and scope of the traffic light control system for emergency vehicles. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory 13 presented in the preceding technical field, background, brief summary or the following detailed description.

Figure 1:
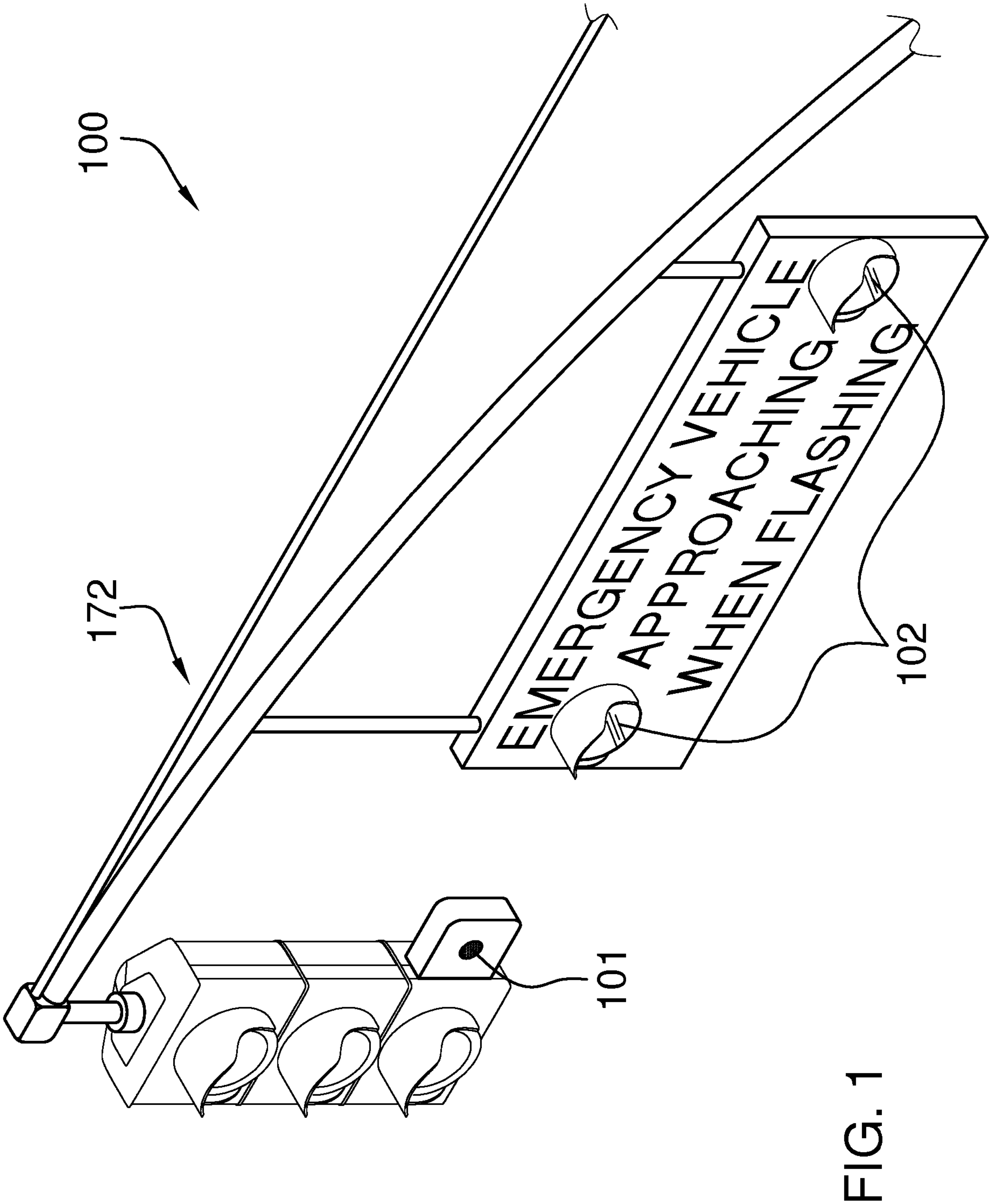
FIG. 1 is a perspective view of an embodiment of the disclosure.
Figure 2:
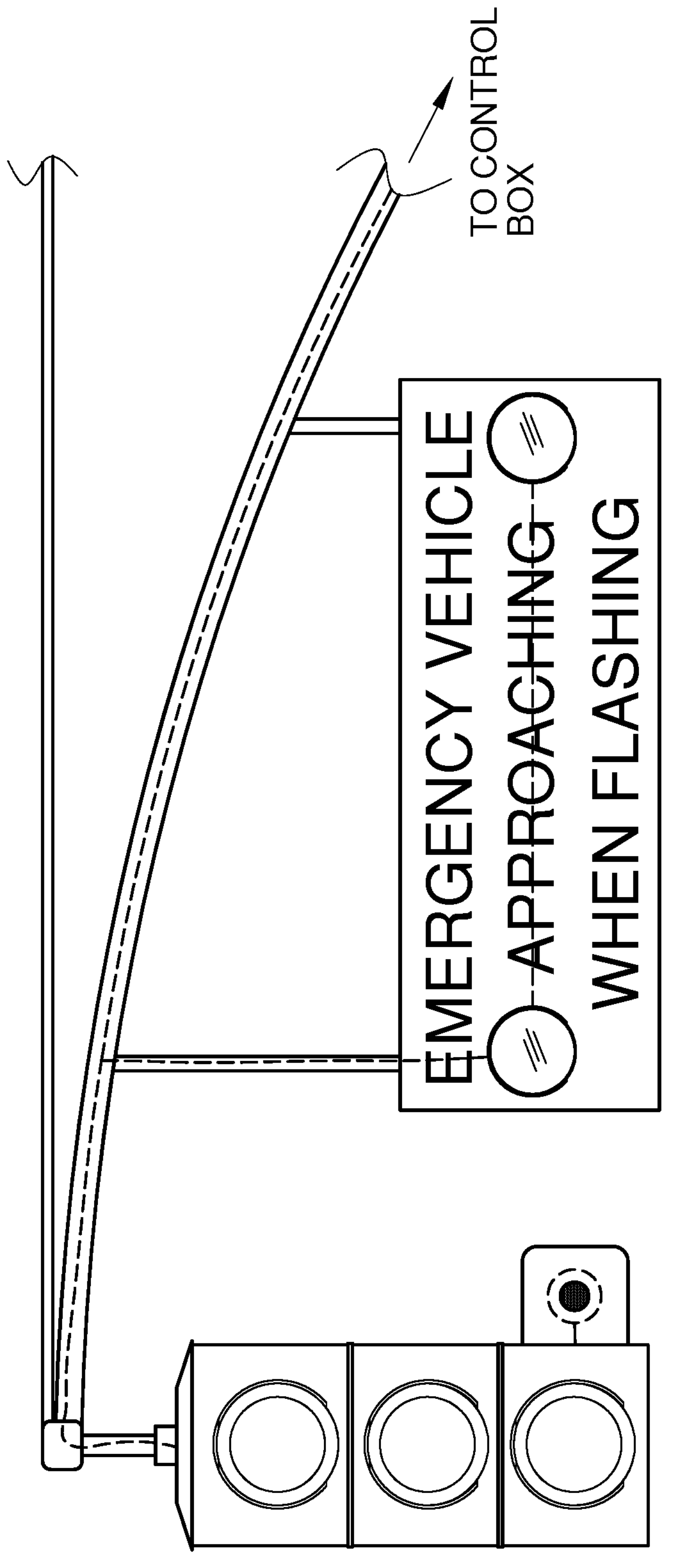
FIG. 2 is a front view of an embodiment of the disclosure.
Figure 3:
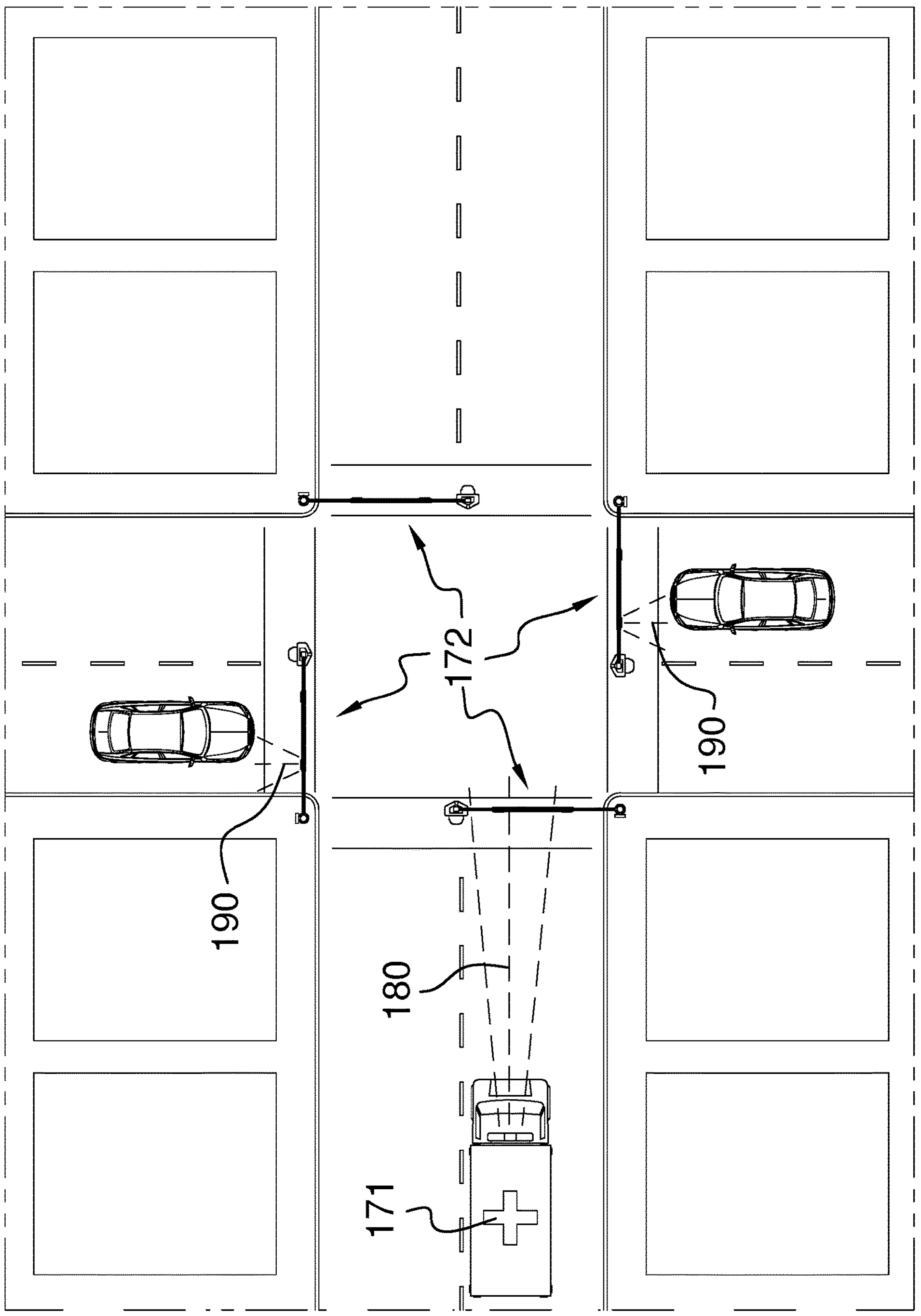
FIG. 3 is an in-use view of an embodiment of the disclosure.
Figure 4:
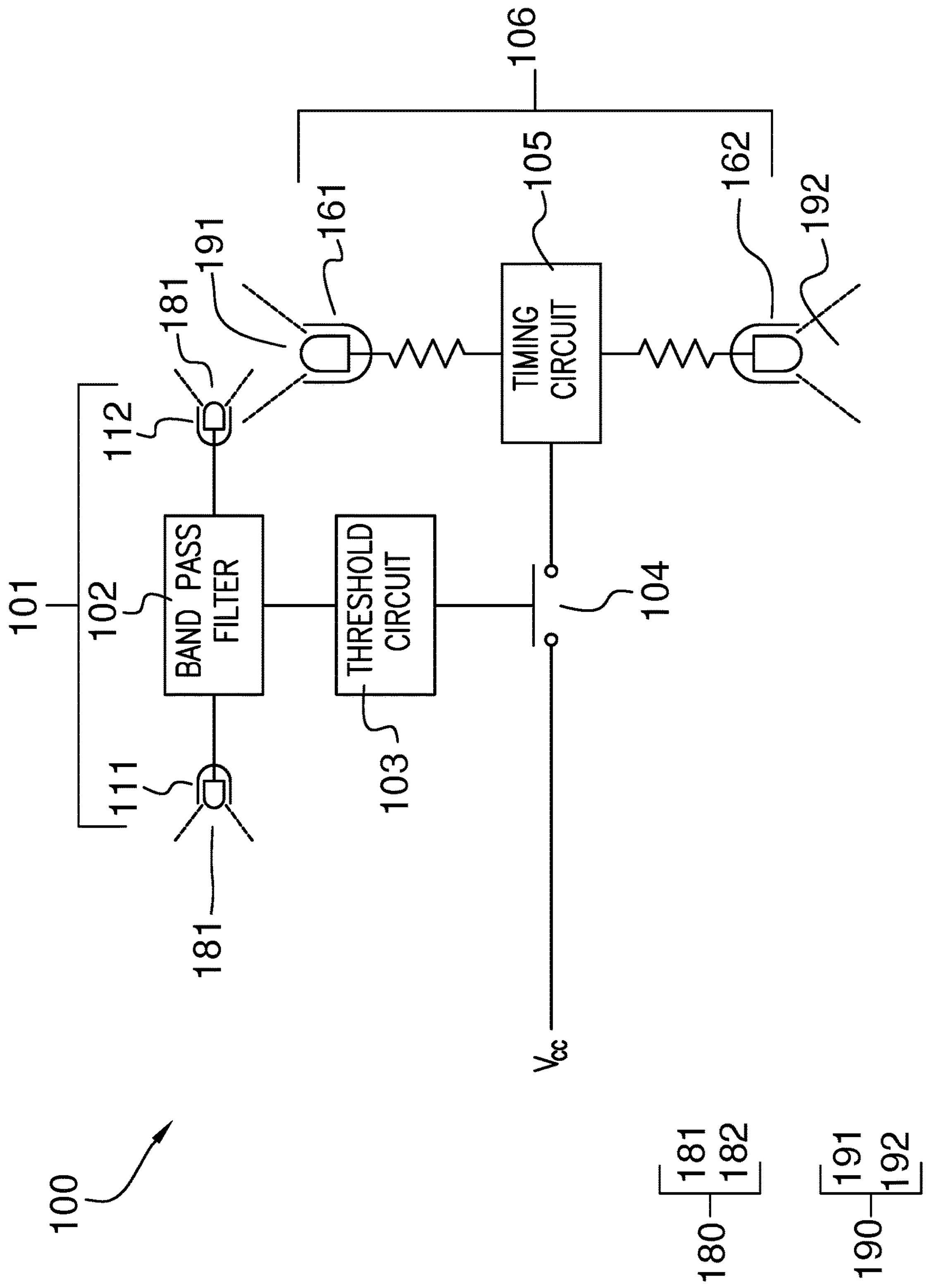
FIG. 4 is a schematic view of an embodiment of the disclosure.

Detailed reference will now be made to one or more potential embodiments of the disclosure, which are illustrated in FIGS. 1 through 4.

The traffic light control system for emergency vehicles 100 (hereinafter invention) is an electric circuit. The invention 100 is configured for use with a road network. The invention 100 controls one or more traffic control signals 172 that are used to control the flow of traffic over the road network. The invention 100 detects the presence of an emergency vehicle 171 that: a) is operating as a privileged vehicle under traffic regulations; and, b) is approaching a traffic intersection. The invention 100 illuminates a beacon that warns traffic about the oncoming emergency vehicle 171. The invention 100 comprises a plurality of directional microphones 101, a band pass filter circuit 102, a threshold circuit 103, a relay circuit 104, a timing circuit 105, and a plurality of lamp circuits 106. The plurality of directional microphones 101, the band pass filter circuit 102, the threshold circuit 103, the relay circuit 104, the timing circuit 105, and the plurality of lamp circuits 106 are electrically interconnected.

The emergency vehicle 171 is defined elsewhere in this disclosure. The traffic control signal 172 is defined elsewhere in this disclosure.

The plurality of directional microphones 101 capture audible sounds from the environment. Each directional microphone selected from the plurality of directional microphones 101 is a transducer. Each selected directional microphone is a microphone. Each selected directional microphone is a directional device. By directional device is meant that each selected directional microphone acts as a sensor that captures audible sounds from a field of view 180. When used with the plurality of directional microphones 101, the term "center axis" refers to a vector that is directed from the sensor to the center of the area that forms the field of view 180. The center axis of the field of view 180 of each selected directional microphone is aligned in a perpendicular direction to a field of illumination 190 that is generated by the plurality of lamp circuits 106.

The plurality of directional microphones 101 captures the audible sound of the siren of the emergency vehicle 171. The plurality of directional microphones 101 converts the captured audible sounds into the first electric signal. The plurality of directional microphones 101 transmits the first electric signal to the band pass filter circuit 102.

The plurality of directional microphones 101 comprises a first directional microphone 111 and a second directional microphone 112. The first directional microphone 111 further comprises a first field of view 181. The second directional microphone 112 further comprises a second field of view 182. The first directional microphone 111 is a directional microphone selected from the plurality of directional microphones 101. The first directional microphone 111 mounts on the traffic control signal 172. The first directional microphone 111 further comprises a first field of view 181. The first directional microphone 111 captures audible environmental sounds that were generated from within the first field of view 181.

The second directional microphone 112 is a directional microphone selected from the plurality of directional microphones 101. The second directional microphone 112 mounts on the traffic control signal 172. The second directional microphone 112 further comprises a second field of view 182. The second directional microphone 112 captures audible environmental sounds that were generated from within the second field of view 182.

The second directional microphone 112 is positioned on the traffic control signal 172 such that the center axis of the second field of view 182 is parallel to the first field of view 181. The second directional microphone 112 is positioned on the traffic control signal 172 such that the position of the second field of view 182 is diametrically opposed to the position of the first field of view 181.

The band pass filter circuit 102 is an electric circuit. The band pass filter circuit 102 is a filter circuit. The band pass filter circuit 102 forms a band pass filter that is tuned to the harmonic signature of the siren of the emergency vehicle 171. The band pass filter circuit 102 receives the first electric signal from the plurality of directional microphones 101. The band pass filter circuit 102 reduces the amplitudes of the higher and lower frequencies from the first electric signal to generate a second electric signal. The band pass filter circuit 102 transmits the second electric signal to the threshold circuit structure 103.

The threshold circuit structure 103 is an electric circuit. The threshold circuit structure 103 acts as a switch. The threshold circuit structure 103 is triggered by the amplitude of the second electric signal. The second electric signal serves as a proxy for the amplitude of the siren of the emergency vehicle 171. When the amplitude of the second electric signal is greater than a predetermined value, the threshold circuit structure 103 initiates the actuation of the relay circuit 104 to a closed position. When the amplitude of the second electric signal is less than a predetermined value, the threshold circuit structure 103 initiates the actuation of the relay circuit 104 to an open position.

The relay circuit 104 is an electrically controlled switch. The relay circuit 104 electrically connects the timing circuit 105 and the plurality of lamp circuits 106 to an externally provided source of electric energy. The electric energy required to power the operation of the timing circuit 105 and the plurality of lamp circuits 106 flows through the relay circuit 104. The relay circuit 104 electrically connects to the threshold circuit structure 103. The threshold circuit structure 103 controls the actuation of the relay circuit 104. The threshold circuit structure 103 actuates the relay circuit 104 into the closed position. In the closed position, the relay circuit 104 allows electric energy to flow into the timing circuit 105 and the plurality of lamp circuits 106. The threshold circuit structure 103 actuates the relay circuit 104 into the open position. In the open position, the relay circuit 104 disables the flow of electric energy into the timing circuit 105 and the plurality of lamp circuits 106.

The timing circuit 105 is an electric circuit. The timing circuit 105 is defined elsewhere in this disclosure. The timing circuit 105 generates a rhythmic electric signal that powers the illumination of the plurality of lamp circuits 106. The operation of the timing circuit 105 is initiated when the threshold circuit structure 103 actuates the relay circuit 104 to the closed position. The operation of the timing circuit 105 is discontinued when the threshold circuit structure 103 actuates the relay circuit 104 to the closed position. The timing circuit 105 illuminates and extinguishes the plurality of lamp circuits 106 to form a flashing pattern that is visible from the traffic control signal 172. The timing circuit 105 initiates the operation of the plurality of lamp circuits 106 as the emergency vehicle 171 approaches the traffic control signal 172.

The plurality of lamp circuits 106 is an electric circuit. The plurality of lamp circuits 106 forms a beacon that illuminates as the emergency vehicle 171 approaches the traffic control signal 172. The plurality of lamp circuits 106 electrically connects to the timing circuit 105. The timing circuit 105 controls the operation of the plurality of lamp circuits 106.

Each selected lamp circuit is an electric circuit. Each selected lamp circuit is a directional device. By directional device is meant that each selected lamp circuit acts as a source of electromagnetic radiation that is transmitted into a field of illumination 190. When used with the plurality of lamp circuits 106, the term "center axis" refers to a vector that is directed from the sensor to the center of the area that forms the field of illumination 190. The center axis of the field of illumination 190 of each selected lamp circuit is aligned in a perpendicular direction to a field of view 180 that is generated by the plurality of directional microphones 101.

The plurality of lamp circuits 106 comprises a first lamp circuit 161 and a second lamp circuit 162. The first lamp circuit 161 further comprises a first field of illumination 191. The second lamp circuit 162 further comprises a second field of illumination 192.

The first lamp circuit 161 is a lamp circuit selected from the plurality of lamp circuits 106. The first lamp circuit 161 mounts on the traffic control signal 172. The first lamp circuit 161 further comprises a first field of illumination 191. The first lamp circuit 161 generates an illumination the is transmitted into the first field of illumination 191.

The second lamp circuit 162 is a lamp circuit selected from the plurality of lamp circuits 106. The second lamp circuit 162 mounts on the traffic control signal 172. The second lamp circuit 162 further comprises a second field of illumination 192. The second lamp circuit 162 generates an illumination the is transmitted into the second field of illumination 192. The second lamp circuit 162 is positioned on the traffic control signal 172 such that the center axis of the second field of illumination 192 is parallel to the first field of illumination 191. The second lamp circuit 162 is positioned on the traffic control signal 172 such that the position of the second field of illumination 192 is diametrically opposed to the position of the first field of illumination 191.

The first lamp circuit 161 is positioned on the traffic control signal 172 such that the center axis of the first field of illumination 191 is perpendicular to the center axis of the first field of view 181. The first lamp circuit 161 is positioned on the traffic control signal 172 such that the center axis of the first field of illumination 191 is perpendicular to the center axis of the second field of view 182.

The second lamp circuit 162 is positioned on the traffic control signal 172 such that the center axis of the second field of illumination 192 is perpendicular to the center axis of the first field of view 181. The second lamp circuit 162 is positioned on the traffic control signal 172 such that the center axis of the second field of illumination 192 is perpendicular to the center axis of the second field of view 182.

The following definitions were used in this disclosure:

Beacon: As used in this disclosure, a beacon refers to a detectable signal that draws the attention of a person or a device to a location. A beacon is commonly used as a guide to the location or as a warning signal about the location. A beacon that draws the attention of a person using an audible signal is called a siren.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter. Include Radial Diametrically Opposed: As used in this disclosure, diametrically opposed is a term that describes the locations of a first object and a second object located at opposite ends of a diameter drawn through a third object. The term diametric opposition can also be used to describe this relationship.

Electric Circuit: As used in this disclosure, an electric circuit is a closed loop path through which electrons flow. The closed loop will generally initiate and terminate at an electrical power source.

Electric Current: As used in this disclosure, an electric current refers to the net movement of electrons past a point in an electric circuit: Electric current is often referred to a current. Electric current is measured in Amperes (Amps) and has the units of coulombs per second.

Electrically Controlled Switch: As used in this disclosure, an electrically controlled switch refers to a switch used to control the flow of electricity through an electric circuit. The actuation of the electrically controlled switch is controlled by an electrical signal. Examples of electrically controlled switches include, but are not limited to, transistors and relays.

Emergency Vehicle: As used in this disclosure, an emergency vehicle is a vehicle that is operated on a road network by an appropriate authority. The emergency vehicle is equipped with visible and audible alarms and markings that indicate that the emergency vehicle operates as a privileged vehicle under traffic regulations and that other vehicles operating on the road network are required yield their rights under the traffic regulations to the emergency vehicle.

Environment: As used in this disclosure, an environment refers to the physical conditions surrounding an object. The term environment is often limited to the physical conditions that the object interacts with.

Extinguish: As used in this disclosure, to extinguish means to cause a device to stop generating an illumination.

Field of Illumination: As used in this disclosure, a field of illumination refers to an area illuminated by electromagnetic radiation projected from an electrical device such as a lamp or transmission antenna.

Field of View: As used in this disclosure, a field of view refers to one or more angles which delimits an area within which a sensor, including the senses of biological entity, will detect a stimulus.

Filter: As used in this disclosure, a filter refers to an electric circuit that: 1) receives an electrical signal as an input; and, based on the input signal, 2) generates an electrical signal as an output an electrical signal that comprises a selected subset of the frequencies that are contained in the input signal. A low pass filter blocks the passage of higher frequencies through the low pass filter. A high pass filter blocks the passage of lower frequencies through the high pass filter. A band pass filter blocks the passage of both lower frequencies and higher frequencies through the band pass filter.

A notch filter blocks the passage of a previously selected continuous range of frequencies through the notch filter. The notch filter allows lower frequencies and higher frequencies to pass through the notch filter. Filters circuits are selected from the group consisting of: a) a filter circuit that is an active electric circuit; and, b) a filter circuit that is a passive electric circuit.

Flash: As used in this disclosure, to flash means to illuminate and extinguish a lamp in a rhythmic pattern.

Illumination: As used in this disclosure, illumination refers to electromagnetic radiation contained within an area. Illumination is a synonym for light, particularly in cases where a measure of the amount of visible electromagnetic radiation in a space is called for. The verb form of illumination is to illuminate and is taken to mean the generation of an illumination.

Interval: As used in this disclosure, the term interval refers to a measure of the distance within an organizational structure between the positions of a first event and a second event that are contained within the organizational structure. The term regular interval is often used to mean that the span of distance between multiple occurrences of the first event and the second event remains constant within the organizational structure. This disclosure assumes that the selected second event can be a repetition of the first event. The term interval is often applied to the organizational structure of time and in this context is taken to mean the period of time that passes the first event and the second event.

Lamp: As used in this disclosure, a lamp is an electrical circuit that generates (typically visible spectrum) electromagnetic radiation.

Logic Circuit: As used in this disclosure, a logic circuit is an electrical device that receives one or more digital or analog inputs and uses those digital or analog inputs to generate one or more digital or analog outputs. This disclosure allows, but does not assume, that the logic circuit is a programmable device.

Microphone: As used in this disclosure, a microphone is a transducer that converts the energy from vibration into electrical energy. The sources of vibrations include, but are not limited to, acoustic energy.

Multipath Structure: As used in this disclosure, a multipath structure refers to a plurality of path structures that offer a plurality of different routes sharing the same starting point and the same destination point. A road network is considered a multipath structure.

Passive and Active Electric Circuit: As used in this disclosure, a passive electric circuit is an electric circuit that does not perform an amplification, oscillation, or switching function. The functions of a passive electric circuit are generally limited to: a) absorbing and dissipating electric energy; b) storing electric energy; c) transferring electric energy; and, d) reflecting electric energy or electromagnetic radiation. A passive electric circuit can change the amplitude but not the frequency of an input signal. Examples of circuit elements used to form passive electric circuits include, but are not limited to, resistors, capacitors, inductors, diodes, and antennas. An active circuit refers to an electric circuit that is not a passive circuit. Active circuits typically require access to a source of externally provided electric energy. Examples of circuit elements used to form active electric circuits include, but are not limited to, operational amplifiers, oscillators, transistors, and logic circuit elements such as logic gates.

Path: As used in this structure, a path is a marked or identified route along which an individual or object can travel. A path is often formed as a track, a road, or a trail.

Pulse: As used in this disclosure, a pulse is a rhythmic signal or stimulus wherein the signal or stimulus has a brief duration.

Radial: As used in this disclosure, the term radial refers to a direction that: 1) is perpendicular to an identified central axis; or, 2) projects away from a center point.

Relay: As used in this disclosure, a relay is an automatic electronic, electromagnetic, or electromechanical device that reacts to changes in voltage or current by opening or closing a switch in an electric circuit. Relays are further defined with a coil and a switch. Applying a voltage to the coil, usually referred to as energizing the coil, will cause the coil to change the position of the switch. This definition is not intended to preclude the substitution of a transistor for a relay. Within this disclosure, a transistor can be considered as a relay. In this scenario, the base voltage is analogous to the coil of the 13 relay and the current flow from the collector to the emitter is analogous to the operation of the switch of the relay. Those skilled in the electrical arts will recognize that this substitution can be made without undue experimentation. The transistor is defined in greater detail elsewhere in this disclosure.

Road Network: As used in this disclosure, a road network describes a plurality of paths that: a) form a multipath structure; and, b) is used to guide the traffic of vehicles.

Rhythm: As used in this disclosure, a rhythm refers to a pattern that repeats at regular intervals.

Supervision: As used in this disclosure, supervision refers to an individual or system that observes and provides direction for the operation of: a) one or more individuals; or, b) a process.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Time: As used in this disclosure, time refers to a structure within which the sequence of all events from the past, through present, and into the future can be organized. Time also refers to a measure of the interval between the occurrence of a first event and the occurrence of a second event within the structure of time.

Timing Circuit: As used in this disclosure, a timing circuit refers to an electrical network of interconnected electrical elements, potentially including but not limited to, resistors, capacitors, diodes, transistors, and integrated circuit devices. The purpose of the timing circuit is to generate an electrical control signal after a predetermined amount of time. In common usage, a timing circuit is also referred to as timing circuitry. The “555” timing circuit is a well-known, documented, and commercially available timing circuit.

Timing Device: As used in this disclosure, the timing device is a device configured for use in measuring the passage of time. The timing device is often called a timer.

Traffic: As used in this disclosure, traffic refers to the simultaneous movement of a plurality of vehicles and pedestrians.

Traffic Control: As used in this disclosure, traffic control refers to a system of rules and signals that supervise the flow of traffic over a road network.

Traffic Control Signal: As used in this disclosure, a traffic control signal is an electrically powered device. The traffic control signal generates one or more visual distinct signals used for directing and controlling traffic flow through a location. A traffic control signal is often called a traffic light.

Transducer: As used in this disclosure, a transducer is a device that converts a physical quantity, such as pressure or brightness into an electrical signal or a device that converts an electrical signal into a physical quantity.

Transistor: As used in this disclosure, a transistor is a general term for a three terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation.

Vcc: As used in this disclosure, Vcc is an acronym for Voltage at the Common Collector. Technically, the Vcc is the primary power source for an NPN transistor. In this disclosure, the definition of Vcc is more broadly defined to mean a direct current voltage source.

With respect to the above description, it is to be realized that the optimum dimensional relationship for the various components of the invention described above and in FIGS.

1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A traffic light control system for emergency vehicles comprising a plurality of directional microphones, a band pass filter circuit, a threshold circuit, a relay circuit, a timing circuit, and a plurality of lamp circuits;

wherein the plurality of directional microphones, the band pass filter circuit, the threshold circuit, the relay circuit, the timing circuit, and the plurality of lamp circuits are electrically interconnected;

wherein the plurality of directional microphones capture audible sounds from the environment and the audible sound of the siren of the emergency vehicle;

wherein each directional microphone selected from the plurality of directional microphones;

wherein each selected directional microphone acts as a sensor to captures audible sounds from a field of view;

wherein when used with the plurality of directional microphones, term “center axis” refers to a vector that is directed from the sensor to the center of the area that forms the field of view;

wherein the center axis of the field of view of each selected directional microphone is aligned in a perpendicular direction to a field of illumination that is generated by the plurality of lamp circuits;

wherein the plurality of directional microphones captures the audible sound of the siren of the emergency vehicle;

wherein the plurality of directional microphones converts the captured audible sounds into the first electric signal;

wherein the plurality of directional microphones transmits the first electric signal to the band pass filter circuit;

wherein the band pass filter circuit forms a band pass filter that is tuned to the harmonic signature of the siren of the emergency vehicle;

wherein the band pass filter circuit receives the first electric signal from the plurality of directional microphones;

wherein the band pass filter circuit reduces the amplitudes of the higher and lower frequencies from the first electric signal to generate a second electric signal;

wherein the band pass filter circuit transmits the second electric signal to the threshold circuit structure that acts as a switch and triggered by the amplitude of the second electric signal;

wherein the second electric signal serves as a proxy for the amplitude of the siren of the emergency vehicle;

wherein when the amplitude of the second electric signal is greater than a predetermined value, the threshold circuit structure initiates the actuation of the relay circuit to a closed position;

wherein when the amplitude of the second electric signal is less than a predetermined value, the threshold circuit structure initiates the actuation of the relay circuit to an open position;

wherein the traffic light control system for emergency vehicles is configured for use with a road network;

wherein the traffic light control system for emergency vehicles controls one or more traffic control signals;

wherein the traffic light control system for emergency vehicles detects the presence of an emergency vehicle that:

a) is operating as a privileged vehicle under traffic regulations; and, b) is approaching a traffic intersection;

wherein the traffic light control system for emergency vehicles illuminates a beacon about the oncoming emergency vehicle responsive to the actuation of the relay circuit to the closed position.

2. The traffic light control system for emergency vehicles according to claim 1 wherein the traffic light control system for emergency vehicles is an electric circuit.

3. The traffic light control system for emergency vehicles according to claim 2 wherein each directional microphone is a transducer.

4. The traffic light control system for emergency vehicles according to claim 3 wherein the band pass filter circuit is an electric circuit;

wherein the band pass filter circuit is a filter circuit;

wherein the threshold circuit structure is an electric circuit.

5. The traffic light control system for emergency vehicles according to claim 4 wherein the relay circuit is an electrically controlled switch;

wherein the relay circuit electrically connects the timing circuit and the plurality of lamp circuits to an externally provided source of electric energy;

wherein the electric energy required to power the operation of the timing circuit and the plurality of lamp circuits flows through the relay circuit;

wherein the relay circuit electrically connects to the threshold circuit structure;

wherein the threshold circuit structure controls the actuation of the relay circuit;

wherein the threshold circuit structure actuates the relay circuit into the closed position;

wherein in the closed position, the relay circuit allows electric energy to flow into the timing circuit and the plurality of lamp circuits;

wherein the threshold circuit structure actuates the relay circuit into the open position;

wherein in the open position, the relay circuit disables the flow of electric energy into the timing circuit and the plurality of lamp circuits.

6. The traffic light control system for emergency vehicles according to claim 5 wherein the timing circuit is an electric circuit;

wherein the timing circuit is defined elsewhere in this disclosure;

wherein the timing circuit generates a rhythmic electric signal that powers the illumination of the plurality of lamp circuits;

wherein the operation of the timing circuit is initiated when the threshold circuit structure actuates the relay circuit to the closed position;

wherein the operation of the timing circuit is discontinued when the threshold circuit structure actuates the relay circuit to the closed position;

wherein the timing circuit illuminates and extinguishes the plurality of lamp circuits to form a flashing pattern that is visible from the traffic control signal;

wherein the timing circuit initiates the operation of the plurality of lamp circuits as the emergency vehicle approaches the traffic control signal;

wherein the plurality of lamp circuits is an electric circuit;

wherein the plurality of lamp circuits forms the beacon that illuminates as the emergency vehicle approaches the traffic control signal;

wherein the plurality of lamp circuits electrically connects to the timing circuit;

wherein the timing circuit controls the operation of the plurality of lamp circuits.

7. The traffic light control system for emergency vehicles according to claim 6 wherein each selected lamp circuit is an electric circuit;

wherein each selected lamp circuit is a directional lamp;

wherein each selected directional lamp circuit acts as a source of electromagnetic radiation that is transmitted into the field of illumination;

wherein when used with the plurality of lamp circuits, term “center axis” refers to a vector that is directed from the sensor to the center of the area that forms the field of illumination;

wherein the center axis of the field of illumination of each selected lamp circuit is aligned in a perpendicular direction to the field of view that is generated by the plurality of directional microphones.

8. The traffic light control system for emergency vehicles according to claim 7 wherein the plurality of directional microphones comprises a first directional microphone and a second directional microphone;

wherein the first directional microphone is selected from the plurality of directional microphones;

wherein the first directional microphone mounts on the traffic control signal;

wherein the first directional microphone further comprises a first field of view;

wherein the first directional microphone captures audible environmental sounds that were generated from within the first field of view;

wherein the second directional microphone is selected from the plurality of directional microphones;

wherein the second directional microphone mounts on the traffic control signal;

wherein the second directional microphone further comprises a second field of view;

wherein the second directional microphone captures audible environmental sounds that were generated from within the second field of view;

wherein the second directional microphone is positioned on the traffic control signal such that the center axis of the second field of view is parallel to the first field of view;

wherein the second directional microphone is positioned on the traffic control signal such that the position of the second field of view is diametrically opposed to the position of the first field of view.

9. The traffic light control system for emergency vehicles according to claim 8 wherein the plurality of lamp circuits comprises a first lamp circuit and a second lamp circuit;

wherein the first lamp circuit is selected from the plurality of lamp circuits;

wherein the first lamp circuit mounts on the traffic control signal;

wherein the first lamp circuit further comprises a first field of illumination;

wherein the first lamp circuit generates an illumination the is transmitted into the first field of illumination;

wherein the second lamp circuit is selected from the plurality of lamp circuits;

wherein the second lamp circuit mounts on the traffic control signal;

wherein the second lamp circuit further comprises a second field of illumination;

wherein the second lamp circuit generates an illumination the is transmitted into the second field of illumination;

wherein the second lamp circuit is positioned on the traffic control signal such that the center axis of the second field of illumination is parallel to the first field of illumination;

wherein the second lamp circuit is positioned on the traffic control signal such that the position of the second field of illumination is diametrically opposed to the position of the first field of illumination.

10. The traffic light control system for emergency vehicles according to claim 9 wherein the first lamp circuit is positioned on the traffic control signal such that the center axis of the first field of illumination is perpendicular to the center axis of the first field of view;

wherein the first lamp circuit is positioned on the traffic control signal such that the center axis of the first field of illumination is perpendicular to the center axis of the second field of view;

wherein the second lamp circuit is positioned on the traffic control signal such that the center axis of the second field of illumination is perpendicular to the center axis of the first field of view;

wherein the second lamp circuit is positioned on the traffic control signal such that the center axis of the second field of illumination is perpendicular to the center axis of the second field of view.

* * * * *